No. 848,804. PATENTED APR. 2, 1907.
E. C. BRUEN.
TRUCK.
APPLICATION FILED JAN. 25, 1906.
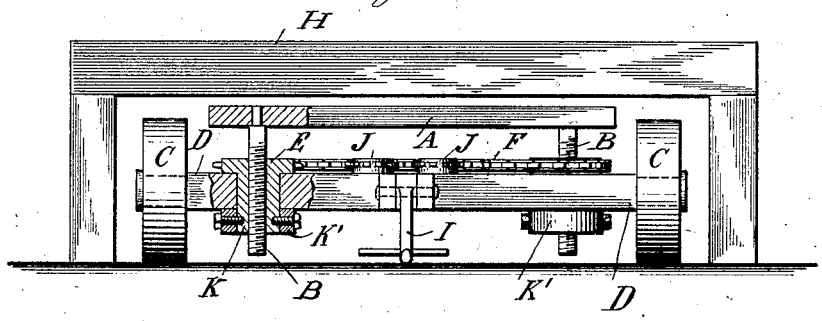
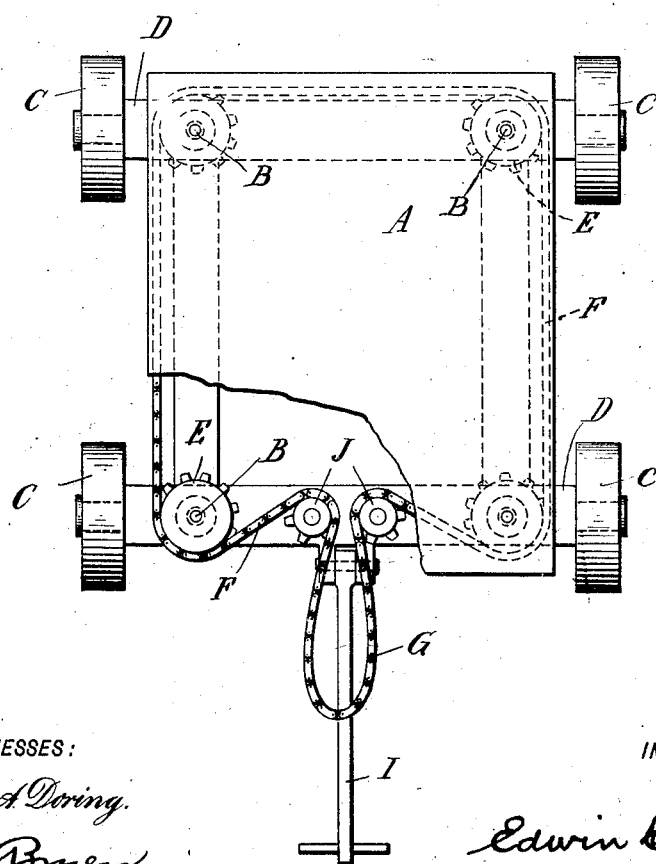
WITNESSES: INVENTOR
Max B. A. Doring. Edwin C. Bruen
Benj. Bruen

UNITED STATES PATENT OFFICE.

EDWIN C. BRUEN, OF BROOKLYN, NEW YORK.

TRUCK.

No. 848,804. Specification of Letters Patent. Patented April 2, 1907.

Application filed January 25, 1906. Serial No. 297,756.

To all whom it may concern:

Be it known that I, EDWIN C. BRUEN, a citizen of the United States, and a resident of Brooklyn, in the county of Kings and State of New York, have invented certain new and useful Improvements in Trucks or Carriers, of which the following is a specification.

The object of my improvement is the production of a carrier for merchandise and materials, the platform of which can be adjusted to varying heights to receive the load to be conveyed from place to place. In mills, factories, large business establishments, and in the construction of buildings, public works, &c., the loading and unloading of merchandise and materials from hand-trucks or other means commonly employed for carrying the load from one place to another involves repeated handling, loss of time, and frequently damage, and I seek by my invention to obviate this.

In the accompanying drawings, illustrating my invention, in both figures of which like parts are designated by similar letters of reference, Figure 1 is an end view, partly in section, of a truck or carrier embodying my improvement; and Fig. 2 is a top plan view thereof.

The flat platform A of my improved truck or carrier is mounted upon and rigidly secured to the upper ends of a series of screws or jacks B, preferably four in number. As shown, the truck or carrier is provided with four wheels C and two axles D. Upon each axle D two sprocket-wheels E are horizontally mounted, and each of said wheels is loosely journaled in a tubular bearing K, extending through said axle and provided at its lower end with a retaining-ring K'. These sprocket-wheels E are centrally cored and threaded to correspond to the threads of the screws or jacks B. An endless sprocket-chain F passes around and engages the outer periphery of each sprocket-wheel E and terminates at one end of the truck or carrier in a loop G, which is formed by carrying each section of the chain inwardly and around an idler J, horizontally mounted on one of the axles D, and then outwardly.

In assembling the parts of my device the screws or jacks supporting the platform A are engaged with the centrally-cored and threaded hubs of the sprocket-wheels extending into the tubular bearing K, and then by manipulation of the chain F the platform A is raised or lowered. For instance, if the chain is pulled or moved to the right the sprocket-wheels will operate to move the screws or jacks upwardly and the platform will be correspondingly raised, and when the chain is pulled or moved to the left the screws or jacks will descend and the platform be lowered.

The intent of my invention is to employ it in connection with a portable receiving-platform H, upon which the merchandise or materials are placed. This portable platform H is provided with legs or longitudinal side pieces upon which it is mounted, whereby the adjustable truck can be run under said platform, as shown in Fig. 1 of the drawings. To convey the load—paper, for instance—to the press-room of a printing establishment without necessitating several handlings, the truck or carrier of my invention is moved, by means of its handle I, under the portable platform H, and the platform A of my device is then raised, by means of the sprocket-chain F, sprocket-wheels E, and screws or jacks B, until it lifts the portable platform H from the floor. My device is then employed as a truck or carrier and moved, by means of its handle, to convey the load of merchandise or materials on the portable platform H to the desired place of use or distribution.

It will be observed that the operation of the screws or jacks is substantially the same as a worm-gear, and one may be substituted for the other without departing from the principle of my invention.

It will be seen from the foregoing description that a truck or carrier embodying the novel feature of my invention of a platform which can be adjusted to and set at varying heights, and hence take and carry a portable receiving-platform and its load, will be of very great utility and advantage in moving merchandise and materials to the desired point of use or distribution, not only in mills, factories, and large commercial establishments, but in the construction of buildings, public works, &c.

While I have described my device as being moved by manual power in transporting the load taken on, it is obvious that any other suitable power may be employed for this purpose.

The power employed for moving the truck or carrier and for operating the sprocket-chain to rotate the sprocket-wheels will depend entirely upon the size of the truck or carrier and the weight of the load it is designed to lift and move.

What I claim as my invention, and desire to secure by Letters Patent, is—

1. The combination in a truck, of a platform rigidly mounted directly upon the upper ends of a series of vertically-adjustable screws, with a series of sprocket-wheels horizontally mounted on the wheel-axles and centrally-cored and threaded to respectively engage said screws, and means such as a sprocket-chain passing around and engaging the outer periphery of each sprocket-wheel, whereby said screws can be adjusted to raise or lower said platform, substantially as described.

2. In a vertically-adjustable truck, a platform rigidly mounted at the respective four corners thereof upon the upper end of vertical screws, each of said screws extending through a tubular bearing and engaging a centrally-cored and threaded sprocket-wheel horizontally mounted on the wheel-axle, and means such as a sprocket-chain passing around and engaging the outer periphery of each sprocket-wheel, whereby said vertical screws can be adjusted to raise or lower said platform, substantially as described.

3. The combination with a truck provided with a platform rigidly mounted upon the upper ends of vertically-adjustable screws, and means for adjusting said screws to raise or lower said platform, of the portable platform H, mounted upon supports, substantially as described for the purposes set forth.

Signed at New York city, in the county of New York and State of New York, this 22d day of January, A. D. 1906.

EDWIN C. BRUEN.

Witnesses:
 BENJ. BRUEN,
 GEO. N. BELL.